(12) United States Patent
Linderman et al.

(10) Patent No.: US 12,104,699 B2
(45) Date of Patent: Oct. 1, 2024

(54) SELF-OPTIMIZING SEAL FOR TURBOMACHINERY, AND ASSOCIATED SYSTEMS AND METHODS

(71) Applicant: Blue Origin, LLC, Kent, WA (US)

(72) Inventors: Ryan Linderman, Bellevue, WA (US); Jacob Mills, Maple Valley, WA (US)

(73) Assignee: BLUE ORIGIN, LLC, Kent, WA (US)

( * ) Notice: Subject to any disclaimer, the term of this patent is extended or adjusted under 35 U.S.C. 154(b) by 0 days.

(21) Appl. No.: 17/715,781

(22) Filed: Apr. 7, 2022

(65) Prior Publication Data
US 2023/0323783 A1    Oct. 12, 2023

(51) Int. Cl.
*F16J 15/34*    (2006.01)
*F02K 9/48*    (2006.01)
*F01D 11/00*    (2006.01)
*F01D 11/12*    (2006.01)

(52) U.S. Cl.
CPC ............. *F16J 15/3432* (2013.01); *F02K 9/48* (2013.01); *F16J 15/34* (2013.01); *F16J 15/3408* (2013.01); *F16J 15/3412* (2013.01); *F16J 15/346* (2013.01); *F01D 11/003* (2013.01); *F01D 11/122* (2013.01); *F05D 2220/30* (2013.01); *F05D 2240/55* (2013.01)

(58) Field of Classification Search
CPC . F01D 11/12–16; F05D 2240/55; F16J 15/34; F16J 15/3408; F16J 15/3412; F16J 15/3432
See application file for complete search history.

(56) References Cited

U.S. PATENT DOCUMENTS

| | | | |
|---|---|---|---|
| 5,066,026 A * | 11/1991 | Heck | F16J 15/3412 277/400 |
| 6,311,983 B1 | 11/2001 | Burcham | |
| 7,377,518 B2 * | 5/2008 | Lai | F16J 15/3408 277/400 |
| 10,337,619 B2 * | 7/2019 | Ruggeri | F16J 15/3412 |
| 11,333,197 B2 * | 5/2022 | Garrison | F01D 11/04 |
| 11,434,828 B2 * | 9/2022 | Miller | F01D 25/183 |

(Continued)

OTHER PUBLICATIONS

NASA Space Vehicle Design Criteria (Chemical Propulsion), "Liquid Rocket Engine Turbopump," NASA SP-8121, Feb. 1978, 168 pages.

(Continued)

*Primary Examiner* — Brian P Wolcott
(74) *Attorney, Agent, or Firm* — Hogan Lovells US LLP

(57) ABSTRACT

A representative seal system (such as a seal system for a turbopump of a rocket engine) automatically adjusts a balance ratio of a seal. The system can include a ring element encircling an axis. A front side of the ring element contacts a revolving surface to form a seal with the revolving surface. The front side can include a stepped surface having two or more steps. Each step includes a sealing surface configured to contact the revolving surface to form a sealing area that is different from a sealing area of each other sealing surface. Each step is positioned and configured to wear away during operation of the machine to expose an underlying surface to the revolving surface, to change the sealing area and the balance ratio of the seal. A representative method of operating a turbomachinery system includes changing the balance ratio of a seal while rotating a rotor.

16 Claims, 4 Drawing Sheets

(56) References Cited

U.S. PATENT DOCUMENTS

2019/0178381 A1* 6/2019 Miller ................ F16J 15/346
2020/0392965 A1* 12/2020 Dam ................. F04D 29/126

OTHER PUBLICATIONS

NASA, "High Performance Liquid Hydrogen Turbopump," https://llis.nasa.gov/lesson/750, Feb. 1, 1999, 4 pages.
Pump & Systems, "Balance in Mechanical Seals & Choosing Pumps for Condition Monitoring," HI Pump FAQ's—Hydraulic Institute, https://www.pumpsandsystems.com/balance-mechanical-seals-choosing-pumps-condition-monitoring, Sep. 6, 2017, 5 pages.
Cannon, James L., "Liquid Propulsion: Propellant Feed System Design," Encyclopedia of Aerospace Engineering, vol. 2, Propulsion & Power, Wiley Publishers, https://ntrs.nasa.gov/api/citations/20100035254/downloads/20100035254.pdf, 2010, 34 pages.

* cited by examiner

SELF-OPTIMIZING SEAL FOR TURBOMACHINERY, AND ASSOCIATED SYSTEMS AND METHODS

TECHNICAL FIELD

The present technology is directed generally to self-optimizing seals, and associated systems and methods. Representative aspects and implementations include seals for turbomachinery such as turbopumps for rocket engines.

BACKGROUND

Liquid rocket engines typically include turbopumps to feed propellant (such as fuel and/or oxidizer) to a combustion chamber. Combustion chamber pressure is one of the largest variables in rocket engine performance. Increasing the discharge pressure of the turbopump increases combustion chamber pressure. When the turbopump discharge pressure increases, the increased pressure exerts stress on the seals and sealing mechanisms within the turbopump. For example, an axial contact rotor seal may have a large pressure differential across its face.

A seal designer often seeks a balanced seal in which the axial contact force (also called the closing force) between a seal and a revolving surface is slightly higher than the force from the high-pressure region tending to open the sealing interface. The balance of a seal can be quantified with a seal balance ratio ("B"). The seal balance ratio B can be expressed as the ratio of the closing area over the face area, where the closing area is the area of the seal that receives the closing force and the face area is the area of contact between the seal and the revolving surface. Seal balance ratio is understood within the fields of seal design, turbopumps, turbomachinery, and other mechanical systems.

A higher balance ratio correlates with a tighter seal interface, which tends to reduce leakage, but which can result in faster wear on the seal. In contrast, a lower balance ratio correlates with a looser seal interface and less wear, but at the expense of more leakage from the high-pressure region to the low-pressure region. A typical conventional seal is designed and tested to have fixed characteristics to minimize leakage at the cost of wear, or to minimize wear at the cost of leakage. The balance ratio of a conventional seal is not intended to change during operation of the seal system. Accordingly, a seal designer must carefully design and test to discover the optimum and/or desirable balance ratio.

Conventional seal design presents several challenges. For example, design efforts and testing efforts to determine the appropriate seal balance ratio may be extensive. In addition, a fixed balance ratio does not adapt to variations in manufacturing tolerances within the turbopump system. A fixed balance ratio also does not adapt to changing conditions within the turbopump system during operation. Accordingly, existing seals with fixed balance ratios can have an undesirably short lifespan and/or an undesirable amount of leakage. Aspects of the present technology are directed to addressing these challenges and other challenges.

BRIEF DESCRIPTION OF THE DRAWINGS

In the drawings, the same reference number indicates the same element throughout the views.

In FIG. 4, the ring element is shown contacting a revolving surface of a rotor.

DETAILED DESCRIPTION

Figure 1:
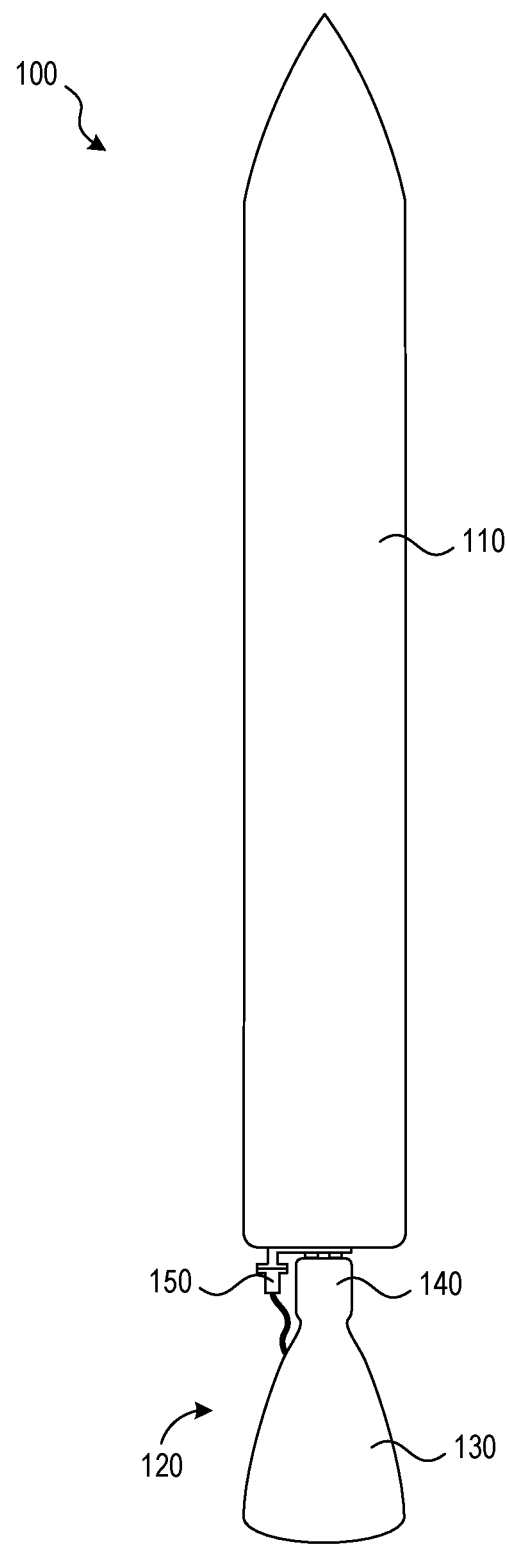
FIG. 1 is a schematic diagram of a rocket system configured in accordance with embodiments of the present technology.

Embodiments of the technology disclosed herein are directed generally to self-optimizing seals, and associated systems and methods. Several embodiments of the present technology are directed to seals for turbomachinery (such as turbopumps in rocket engines), but the present technology can be implemented in other systems in which a seal is used in a rotating or revolving interface.

A representative seal system includes a ring element encircling an axis. A front side of the ring element can contact a revolving surface of a machine, such as turbomachinery (e.g., a turbopump for a rocket engine), to form a seal with the revolving surface. The front side can include a stepped surface having two or more steps. Each step can include a sealing surface configured to contact the revolving surface to form a sealing area that is different from a sealing area of each other sealing surface. Each step is positioned and configured to wear away during operation of the machine to expose an underlying step and surface to change the sealing area and the balance ratio of the seal.

A representative turbomachinery system (e.g., a turbopump system for a rocket engine) includes a shaft positioned to rotate about an axis, a rotor fixed to the shaft and positioned to rotate with the shaft about the axis, and a seal system including a ring element encircling the axis. The rotor can include a revolving surface positioned to revolve around the axis. The ring element can include a front side that contacts the revolving surface. The front side can include a stepped surface having a plurality of steps. A first step positioned closer to the revolving surface than any other step has a first sealing surface with a first surface area contacting the revolving surface. The first sealing surface is positioned and configured to wear away to expose a second sealing surface of a second step. The second sealing surface has a second surface area that is different from (e.g., greater than) the first surface area. The second sealing surface is configured to contact the revolving surface after the first sealing surface has worn away.

A representative rocket system includes a nozzle, a combustion chamber connected to the nozzle, and a turbopump positioned to direct fuel, oxidizer, and/or other material into the combustion chamber. The turbopump can include a shaft positioned to rotate about an axis, a rotor fixed to the shaft and positioned to rotate with the shaft about the axis, and a seal system positioned to resist passage of the material (e.g., fuel and/or oxidizer) past an interface between the seal system and the rotor (i.e., to inhibit fuel, oxidizer, and/or other material from passing the sealing interface). The seal system can include a ring element encircling the axis. A front side of the ring element includes a stepped surface having a first step and a second step, wherein the first step is positioned closer to the rotor surface than is the second step. The first step has a first sealing surface that is positioned and configured to wear against a rotor surface to expose a second sealing surface of the second step. The second sealing surface has a surface area that is different from (e.g., greater than) a surface area of the first sealing surface.

A representative method of operating a turbomachinery system includes rotating a rotor while a ring element contacts the rotor surface to form a seal with the rotor surface, and changing the balance ratio of the seal while rotating the rotor. Changing the balance ratio of the seal can include wearing away a face of the ring element (e.g., wearing away one or more steps of the ring element).

Several details describing structures and processes that are well-known and often associated with turbomachinery, pumps, turbopumps, rocket engines, or other machines are not set forth in the following description to avoid obscuring other aspects of the present technology. Moreover, although the following disclosure sets forth several embodiments, several other embodiments can have configurations, arrangements, and/or components that are different than those described herein. In particular, other embodiments may have additional elements and/or may lack one or more of the elements described below with reference to FIGS. 1-6.

As explained in further detail below, embodiments of the present technology provide a seal system with a variable balance ratio that adapts to changing conditions within a machine system, variations in tolerances of the machine system, and/or other conditions.

FIG. 1 is a schematic diagram of a rocket system 100 configured in accordance with embodiments of the present technology. The rocket system 100 can include a rocket body 110 that carries a propulsion system, such as a rocket engine 120. The rocket engine 120 can include a nozzle 130 and a combustion chamber 140 connected to the nozzle 130. The rocket system 100 can carry propellants such as fuel and/or oxidizer, which undergo combustion in the combustion chamber 140. Exhaust from the nozzle 130 produces thrust for the rocket system 100. A typical rocket engine includes a turbopump 150 for rapidly delivering and/or directing high pressure fuel and/or oxidizer to the combustion chamber 140. Conventional aspects of nozzles, combustion chambers, turbopumps, and other aspects of rocket systems are known in the art.

Figure 2:
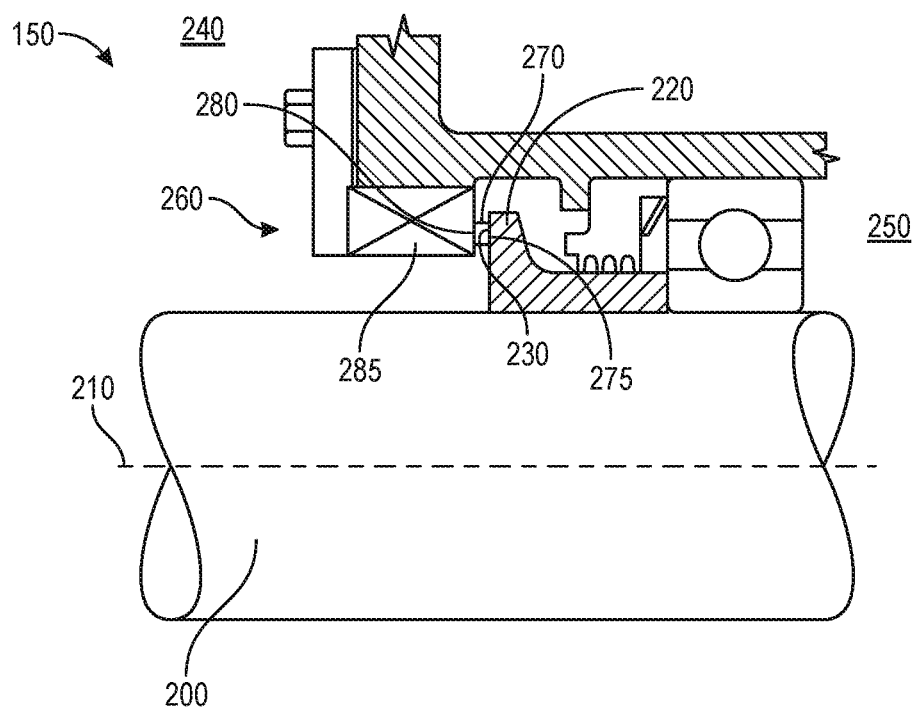
FIG. 2 is a schematic diagram of a portion of a turbopump suitable for implementation in a propulsion system of the rocket system shown in FIG. 1.

FIG. 2 is a partially schematic diagram of a portion of a turbopump 150 suitable for implementation in the rocket engine 120 shown in FIG. 1. The turbopump 150 can include several conventional components known in the art. For example, in some embodiments, the turbopump 150 includes a shaft 200 positioned to rotate about an axis 210. The shaft 200 may rotate at high speeds. The turbopump 150 further includes a rotor 220 fixed to the shaft 200 and positioned to rotate with the shaft 200 about the axis 210. The rotor 220 includes a rotor surface 230 (hereinafter referred to as a revolving surface 230) positioned to revolve around the axis 210 as the rotor 220 rotates around the axis 210. Rotors associated with turbopumps and machinery are known in the art, so the rotor 220 is illustrated only schematically. The rotor 220 can include, or can be connected to, an impeller for compressing and/or driving a fluid.

The rotor 220 and/or an impeller or compressor connected to the rotor 220 can generate pressure such that one side of the rotor 220 is in (or connected to) a low-pressure region 240 and the other side of the rotor 220 is in (or connected to) a high-pressure region 250. In order to separate the high-pressure region 250 from the low-pressure region 240 and to reduce (e.g., minimize or eliminate) leaks from the high-pressure region 250 to the low-pressure region 240, the turbopump 150 includes a seal system 260. The seal system 260 includes a ring element 270 encircling the axis 210. In FIG. 2, the ring element 270 is illustrated only schematically.

The ring element 270 can include a front side 275 and a back side 280 positioned opposite the front side 275. The front side 275 contacts the revolving surface 230. The contact area between the ring element 270 (specifically, the front side 275) and the revolving surface 230 constitutes a sealing interface, where the seal system 260 (specifically, the ring element 270) seals off the high-pressure region 250 to reduce (e.g., minimize or eliminate) leaks to the low-pressure region 240. In other words, the seal system 260 is positioned to inhibit fuel, oxidizer, and/or other material from passing the sealing interface between the ring element 270 and the rotor 220.

In some embodiments, the seal system 260 includes a biasing element 285 positioned to bias the front side 275 toward the revolving surface 230. In some embodiments, the biasing element 285 comprises a spring, such as a compression spring. In some embodiments, the biasing element 285 comprises a metal bellows. A biasing element is not necessary, and some embodiments may not include a biasing element. Pressure and force from the high-pressure region 250, along with force from the optional biasing element 285, produces axial contact force that presses the ring element 270 against the revolving surface 230 to seal off the high-pressure region 250 from the low-pressure region 240.

When the turbopump 150 operates, the revolving surface 230 slides against the ring element 270, which may not rotate. According to embodiments of the present technology, the front side 275 of the ring element 270 wears away intentionally and passively to change the face area of the ring element 270. As a result of wearing away, the front side 275 automatically adjusts the seal balance ratio, and therefore automatically balances design life (seal wear) with acceptable leakage, as explained in further detail below with regard to FIGS. 3-6. The wearing away may result in some fine debris that is acceptable for machine operation. Because seals configured according to embodiments of the present technology can operate with less wear than conventional seals, less debris may be produced than conventional seals.

Figure 3:
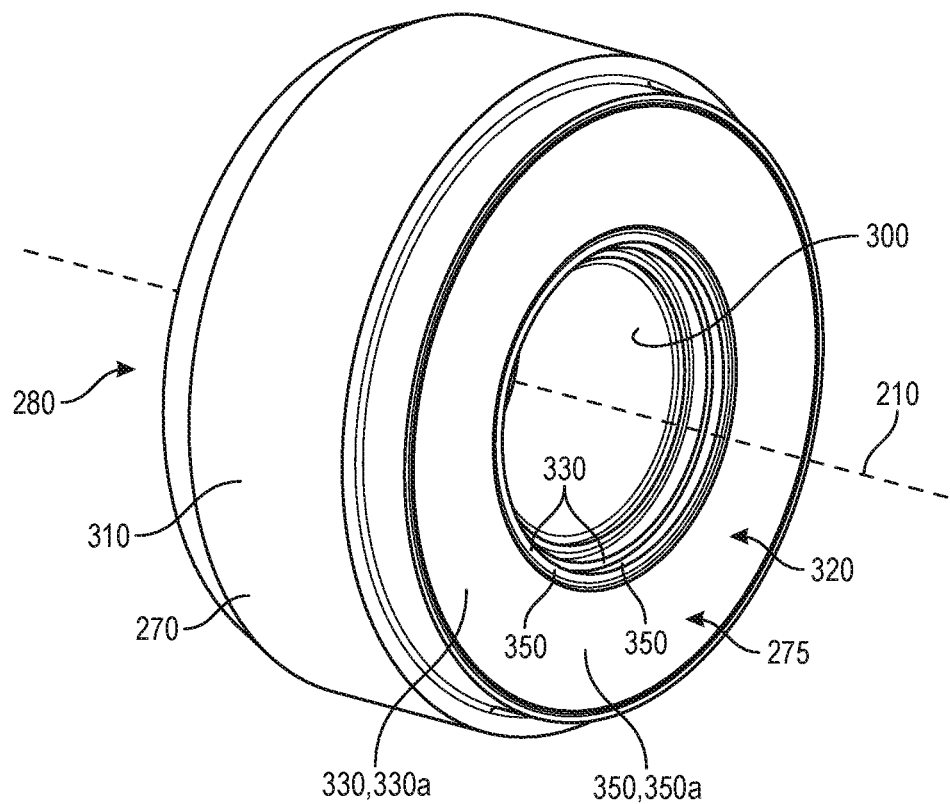
FIG. 3 is a partially schematic illustration of a ring element suitable for use in a sealing system and configured in accordance with embodiments of the present technology.

FIG. 3 is a partially schematic illustration of the ring element 270, configured in accordance with embodiments of the present technology. The ring element 270 is not drawn to scale or proportion. Instead, it is drawn to illustrate some aspects of embodiments of the present technology. The ring element 270 can include a radially inward surface 300, a radially outward surface 310, the back side 280 (which extends between the radially inward surface 300 and the radially outward surface 310), and the front side 275 (which also extends between the radially inward surface 300 and the radially outward surface 310). The front side 275 includes a stepped surface 320, which has two or more levels or steps 330 that each have their own sealing surface 350 for contacting the rotor 220 (see FIG. 2).

Visible in FIG. 3 are a first step 330a, a first sealing surface 350a of the first step 330a, and only portions of other sealing surfaces 350. This is because the sealing surfaces 350 are positioned and configured to wear away to expose an underlying sealing surface 350, so the underlying sealing surfaces 350 are not exposed for contact with the rotor 220 (see FIG. 2) until an exposed sealing surface 350 has worn away. The stepped configuration of the front side 275 provides each sealing surface 350 with a different surface area (face area), so that as the front side 275 wears away, the face area of the seal and the balance ratio changes.

Figure 4:
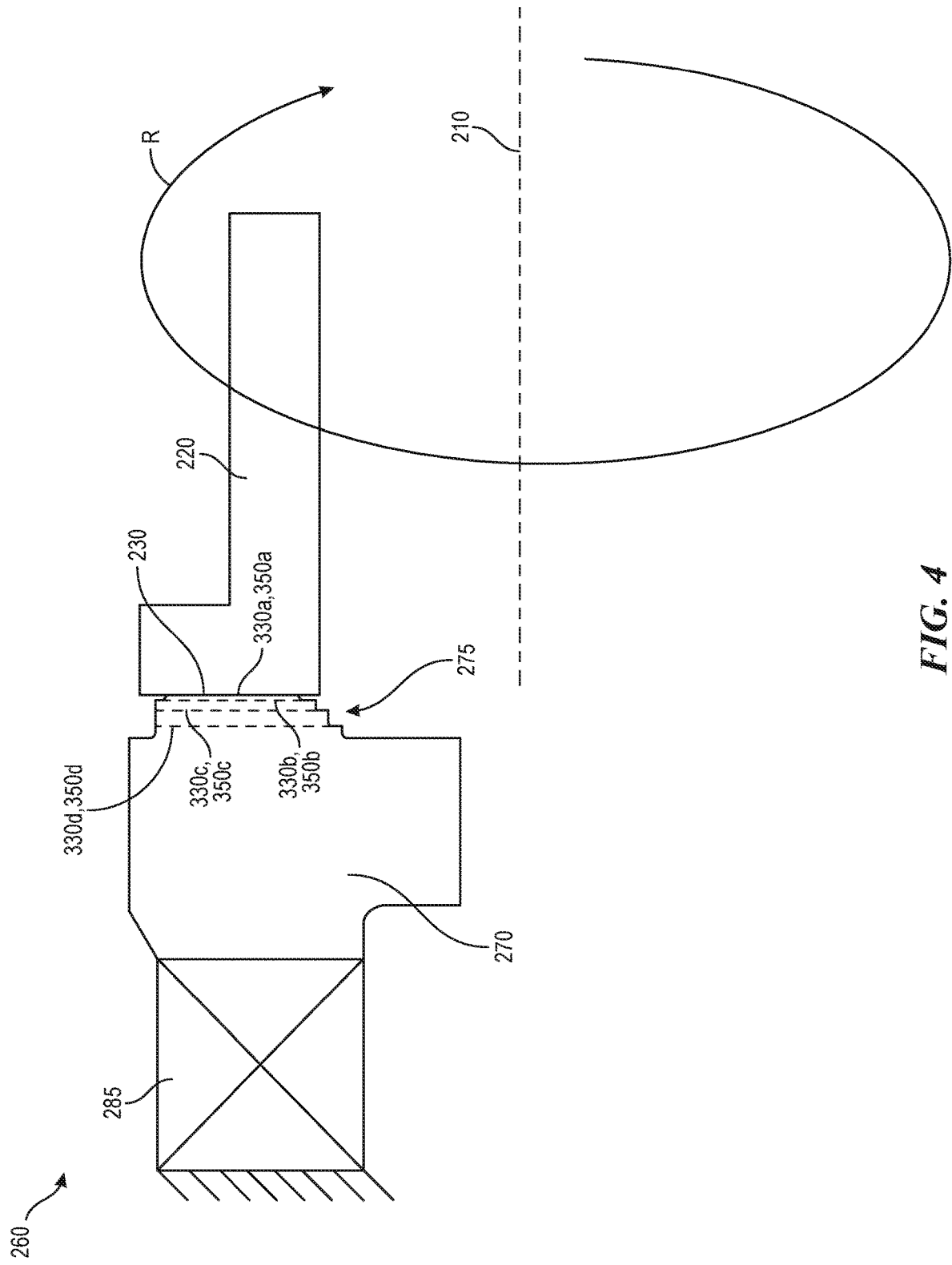
FIG. 4 is a schematic cross-sectional view of a portion of the ring element shown in FIGS. 2 and 3.

FIG. 4 is a partially schematic cross-sectional view of a portion of the seal system 260. Specifically, FIG. 4 illustrates a schematic cross-sectional view of a portion of the ring element 270 contacting the rotor 220 as the rotor 220 rotates around the axis 210 (indicated by rotational arrow R) and as the revolving surface 230 slides against the front side 275 of the ring element 270. The first step 330*a* and its first sealing surface 350*a* are initially positioned closer to the revolving surface 230 than any other step 330 or sealing surface 350. Each successive sealing surface 350 is positioned to wear away in a manner that exposes a sealing surface 350 having a greater surface area.

For example, the first sealing surface 350*a* has a first sealing surface area. The first sealing surface 350*a* is positioned and configured to wear away to expose a second sealing surface 350*b* on a second step 330*b*, thereby causing the second sealing surface 350*b* on the second step 330*b* to contact the revolving surface 230. The second sealing surface 350*b* has a second sealing surface area that is greater than the first sealing surface area of the first sealing surface 350*a*. The second sealing surface 350*b* is positioned and configured to wear away to expose a third sealing surface 350*c* on a third step 330*c*, thereby causing the third sealing surface 350*c* on the third step 330*c* to contact the revolving surface 230. The third sealing surface 350*c* has a third sealing surface area that is greater than the second sealing surface area of the second sealing surface 350*b*. The third sealing surface 350*c* is positioned and configured to wear away to expose a fourth sealing surface 350*d* on a fourth step 330*d*, thereby causing the fourth sealing surface 350*d* on the fourth step 330*d* to contact the revolving surface 230. The fourth sealing surface 350*d* has a fourth sealing surface area that is greater than the third sealing surface area of the third sealing surface 350*c*. The steps 330*b*, 330*c*, 330*d* and surfaces 350*b*, 350*c*, 350*d* are illustrated with dashed lines to indicate that they are generally concealed beneath other steps and surfaces until the outer steps and surfaces (which are positioned closer to the rotor 220) are worn away during operation.

Although some embodiments can include four steps 330 and four sealing surfaces 350, other embodiments can include another suitable quantity of steps 330 and sealing surfaces 350, such as two or more steps 330 and corresponding sealing surfaces 350. Each step 330 and its sealing surface 350 are positioned along (but radially offset from) the axis 210 at a location that is different from each other step 330 and sealing surface 350, and each sealing surface 350 can have a different sealing surface area (face area) than each other sealing surface 350. The steps 330 can have sealing surfaces 350 with greater sealing surface area toward the back side 280 of the ring element 270 than toward the front side 275 of the ring element 270. Accordingly, the balance ratio of the ring element 270 changes during operation as each step 330 wears away to reveal a different sealing surface area (face area).

Figure 5:
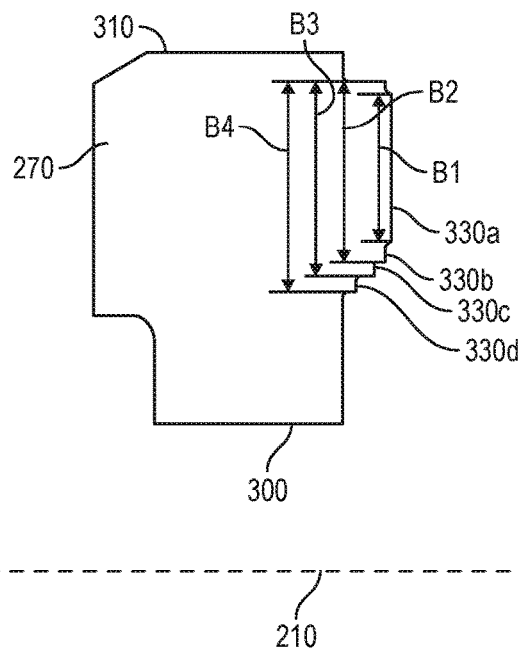
FIG. 5 is a detailed schematic cross-sectional view of a portion of the ring element shown in FIGS. 2-4.

FIG. 5 is a detailed schematic cross-sectional view of a portion of the ring element 270. Each step 330 (e.g., first through fourth steps 330*a*, 330*b*, 330*c*, 330*d*) is positioned and configured to wear away in a manner that changes a balance ratio of the seal system 260 (in particular, of the ring element 270) during operation of the turbopump 150. As the sealing surface area (face area) increases, the balance ratio and the contact pressure correspondingly decreases. For example, in some embodiments, the first step 330*a* can provide a balance ratio B1 of approximately 0.80. The second step 330*b* can provide a balance ratio B2 of approximately 0.70. The third step 330*c* can provide a balance ratio B3 of approximately 0.60. The fourth step 330*d* can provide a balance ratio B4 of approximately 0.50. Generally, in some embodiments, the steps 330 can provide balance ratios between 0.5 and 0.8. In some embodiments, one or more steps 330 can provide a balance ratio greater than 1.0. For example, in some embodiments, a balance ratio of one or more of the steps 330 can be between 0.50 and 1.20. Although specific balance ratios are disclosed herein, seal systems 260 and ring elements 270 can implement different balance ratios and/or different combinations of balance ratios. A thickness of each step 330 along the axis 210 can depend on the wear rate of the material, the surface area, requirements for operating time, and other variables. A seal designer will understand how to select the thickness of each step 330 without undue experimentation.

Figure 6:
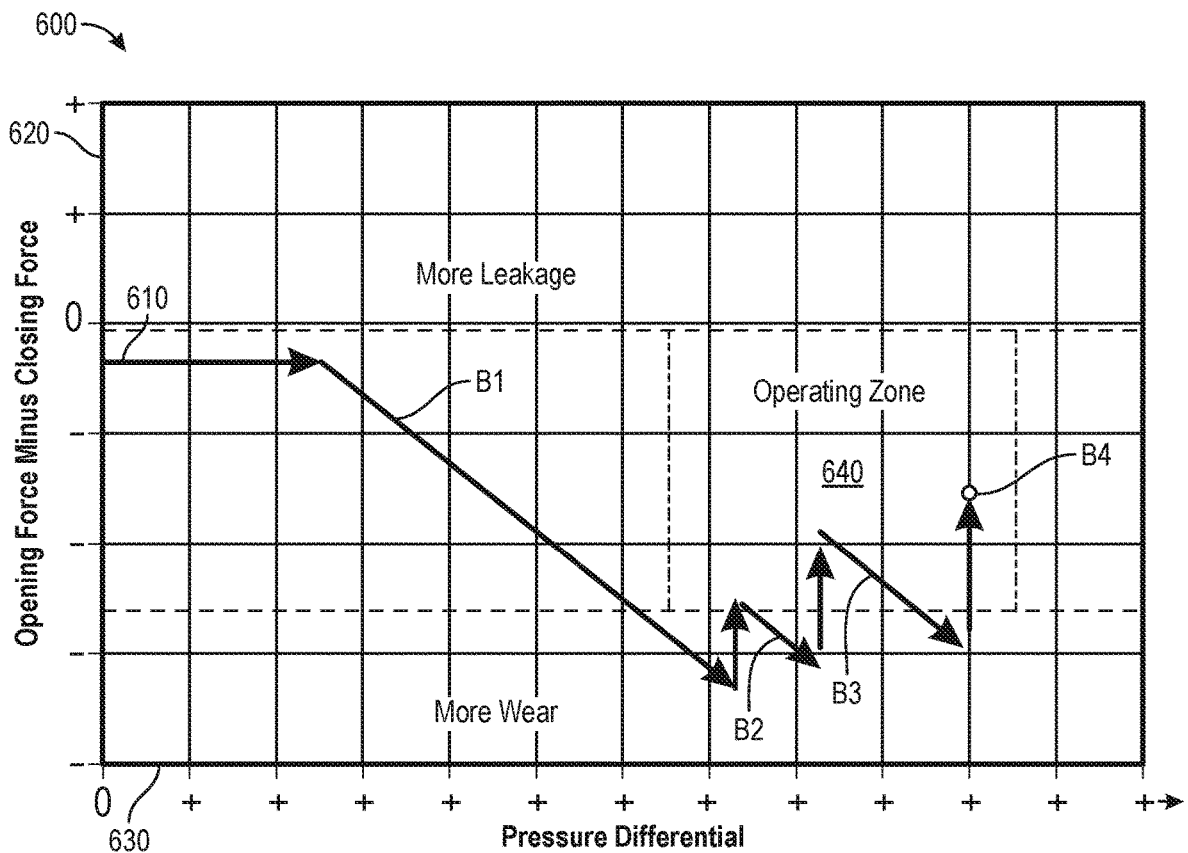
FIG. 6 illustrates a graph of an estimated wear path of a seal system and the ring element, in accordance with embodiments of the present technology

FIG. 6 illustrates a graph 600 of an estimated wear path 610 of a seal system 260 and the ring element 270, in accordance with embodiments of the present technology. The vertical axis 620 represents values of the difference between the opening force on the ring element 270 and the closing force on the ring element 270. A positive difference generally results in leakage. A negative difference can result in a generally balanced seal, although a high negative difference results in increased wear. The horizontal axis 630 represents the pressure differential across the seal face (such as the pressure differential between the high-pressure region 250 and the low-pressure region 240 shown in FIG. 2).

During operation, as the pressure differential increases, the closing force may tend to increasingly overcome the opening force, resulting in more wear. Accordingly, with reference to FIGS. 4-6, although the seal system 260 starts at the highest balance ratio B1, the ring element 270 wears away (specifically, as the first step 330*a* wears away). When the first step 330*a* has worn away, the second step 330*b* is exposed. The increased area of the second step 330*b* results in a decreased balance ratio B2, which results in less wear on the second step 330*b*. As the pressure differential increases, the closing force on the second step 330*b* increases, which wears away the second step 330*b* to expose the larger area of the third step 330*c* and its corresponding reduced balance ratio B3, which results in less wear on the third step 330*c*. As the pressure differential increases, the closing force on the third step 330*c* increases, which wears away the third step 330*c* to expose the larger area of the fourth step 330*d* and its corresponding reduced balance ratio B4, which results in less wear on the fourth step 330*d*.

The balance ratio adjustment process described above is passive and automatic, and tends to keep the seal system 260 and the ring element 270 near or within a selected operating zone 640 (for example, an optimal operating zone) corresponding to a selected contact force (opening force minus closing force), such as an optimal contact force corresponding to a selected and/or acceptable rate of wear and leakage. Accordingly, embodiments of the present technology facilitate automatically adjusting the balance ratio to improve (for example, maximize) the life of a seal system 260 and a ring element 270. Embodiments of the present technology, therefore, include self-optimizing ring elements 270 that wear away towards an optimal balance ratio. Seal systems and ring elements configured in accordance with embodiments of the present technology can improve rate of wear and/or leakage by a factor of two, and they can provide additional margin relative to conventional seals and seal systems.

Embodiments of the present technology further include methods of operating a turbomachinery system, such as a turbopump for a rocket engine or another machine. In some embodiments, a method can include rotating a rotor about an axis. The rotor can include a rotor surface (e.g., the revolving surface 230). The method can further include positioning a ring element around the axis and positioning a front side of the ring element in contact with the rotor surface to form a seal with the rotor surface between a first region (such as the high-pressure region 250) and a second region (such as the low-pressure region 240). The method can include changing a balance ratio of the seal while rotating the rotor and/or while operating the machinery system. Changing the balance ratio of the seal can include wearing away a face of the ring element (such as the stepped surface 320 of the front side 275 of the ring element 270). For example, in some embodiments, changing the balance ratio comprises wearing away a first sealing surface (such as the first sealing surface 350a) to expose a second sealing surface (such as the second sealing surface 350b) on a second step (such as the second step 330b). The second sealing surface can have a second surface area that is greater than the surface area of the first sealing surface. After the first sealing surface has worn away, the second sealing surface contacts the rotor surface. Subsequent steps and surfaces can wear away as explained above, resulting in increasing and/or otherwise changing the surface area of the ring element 270 that contacts the rotor surface 230, which changes the balance ratio of the seal.

In some embodiments, the ring element 270 can include a ceramic material such as a carbon ceramic material. In other embodiments, the ring element 270 can include other materials.

One feature of several of the embodiments described above with regard to FIGS. 1-6, and with other embodiments configured according to the present disclosure, is that a seal designer can avoid or forego determining an exact balance ratio for a seal in a machine. Rather, the designer may select a plurality of balance ratios for steps of the seal and allow the seal to self-optimize. This approach can allow the seals to perform well, despite being subjected to different conditions, and/or despite being manufactured with some variability, and/or despite being implemented in systems that have been manufactured with some variability. Although seal systems configured in accordance with embodiments of the present technology are described for use in turbopumps for rocket engines, embodiments of the present technology include seal systems and ring elements implemented in other machines, such as other turbomachinery, aircraft engines, oil pumps, gas pumps, other kinds of pumps, or in any mechanism that involves sealing an assembly with a revolving surface, or in any seal interface between static and rotating objects.

From the foregoing, it will be appreciated that specific embodiments of the disclosed technology have been described herein for purposes of illustration, but that various modifications may be made without deviating from the technology. For example, although a quantity of steps has been disclosed, and shapes of steps have been illustrated in the Figures, other embodiments can include other quantities and shapes of steps. Although specific dimensions and example shapes are provided for context and/or to indicate representative embodiments, various further embodiments can have other sizes or characteristics (for example, sizes commensurate with strength requirements, durability requirements, and/or other variables).

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms. As used herein, the terms "generally" and "approximately" refer to values or characteristics within a range of ±10% from the stated value or characteristic, unless otherwise indicated.

We claim:

1. A seal system for turbomachinery, wherein the seal system comprises a ring element encircling an axis, wherein the ring element comprises:
    a radially inward surface;
    a radially outward surface;
    a back side extending between the radially inward surface and the radially outward surface; and
    a front side positioned opposite the back side and extending between the radially inward surface and the radially outward surface, wherein the front side is positioned to contact a revolving surface of the turbomachinery;
    wherein:
        the front side comprises a stepped surface having two or more steps;
        each step comprises a sealing surface positioned along the axis at a location that is different from a sealing surface of each other step;
        each sealing surface is configured to contact the revolving surface, wherein contact between the revolving surface and the sealing surface is within a sealing area;
        each sealing surface comprises a sealing area that is different from a sealing area of each other sealing surface of the two or more steps; and
        the seal system further comprises a closing area sized with respect to a face area according to a balance ratio which changes between 0.5 and 1.2 as each step wears away during operation of the turbomachinery, wherein the balance ratio is expressed as a ratio of the closing area, receiving a closing force between the ring element and the revolving surface, with respect to the face area of contact between the front side and the revolving surface.

2. The seal system of claim 1, wherein the ring element comprises a ceramic material.

3. The seal system of claim 2, wherein the ceramic material includes carbon.

4. The seal system of claim 1, wherein each of the two or more steps provides a balance ratio, and wherein each of the two or more steps provides a different balance ratio than each other step of the two or more steps.

5. The seal system of claim 1, wherein the two or more steps comprises four steps.

6. The seal system of claim 1, further comprising a biasing element positioned to bias the front side toward the revolving surface.

7. The seal system of claim 6, wherein the biasing element comprises a spring or metal bellows.

8. A seal system for turbomachinery, wherein the seal system comprises a ring element encircling an axis, wherein the ring element comprises:
    a radially inward surface;

a radially outward surface;

a back side extending between the radially inward surface and the radially outward surface; and a front side positioned opposite the back side and extending between the radially inward surface and the radially outward surface, wherein the front side is positioned to contact a revolving surface of the turbomachinery;

wherein:

the front side comprises a stepped surface having two or more steps, wherein the two or more steps comprise a first step positioned farther from the back side than a second step;

each step comprises a sealing surface positioned along the axis at a location that is different from a sealing surface of each other step;

each sealing surface is configured to contact the revolving surface, wherein contact between the revolving surface and the sealing surface is within a sealing area;

each sealing surface comprises a sealing area that is different from a sealing area of each other sealing surface of the two or more steps;

the seal system further comprises a closing area sized with respect to a face area according to a balance ratio which changes between 0.5 and 1.2 as each step wears away during operation of the turbomachinery, wherein the balance ratio is expressed as a ratio of the closing area, receiving a closing force between the ring element and the revolving surface, with respect to the face area of contact between the front side and the revolving surface;

a portion of the radially inward surface on the first step is positioned radially outward relative to a portion of the radially inward surface on the second step; and a portion of the radially outward surface on the first step is positioned radially inward relative to a portion of the radially outward surface on the second step.

9. The seal system of claim 8, wherein each of the two or more steps provides a balance, and wherein each of the two or more steps provides a different balance ratio than each other step of the two or more steps.

10. The seal system of claim 8, wherein the two or more steps comprise a third step adjacent to the second step, and wherein a radial position of the portion of the radially outward surface on the second step is the same as a radial position of a portion of the radially outward surface on the third step.

11. The seal system of claim 8, wherein the ring element comprises a ceramic material.

12. The seal system of claim 11, wherein the ceramic material includes carbon.

13. The seal system of claim 8, wherein the two or more steps comprise four steps.

14. The seal system of claim 8, further comprising a biasing element positioned to bias the front side toward the revolving surface.

15. The seal system of claim 14, wherein the biasing element comprises a spring or metal bellows.

16. The seal system of claim 8, wherein at least one step of the two or more steps provides a balance ratio greater than 1.0.

* * * * *